United States Patent
Wakamatsu

(10) Patent No.: US 10,209,656 B1
(45) Date of Patent: Feb. 19, 2019

(54) IMAGE FORMING APPARATUS AND CONSUMED POWER REDUCTION METHOD

(71) Applicants: KABUSHIKI KAISHA TOSHIBA, Tokyo (JP); TOSHIBA TEC KABUSHIKI KAISHA, Tokyo (JP)

(72) Inventor: Masaaki Wakamatsu, Chigasaki Kanagawa (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/937,763

(22) Filed: Mar. 27, 2018

(30) Foreign Application Priority Data

Aug. 10, 2017 (JP) ................. 2017-156038

(51) Int. Cl.
*G03G 15/01* (2006.01)
*G03G 15/00* (2006.01)

(52) U.S. Cl.
CPC ..... *G03G 15/5004* (2013.01); *G03G 15/0178* (2013.01)

(58) Field of Classification Search
USPC ......... 399/9, 33, 38–40, 42, 45, 67, 69, 320, 399/321, 341
See application file for complete search history.

(56) References Cited

U.S. PATENT DOCUMENTS

| 8,582,986 | B2* | 11/2013 | Kawai ............... G03G 15/5079 399/8 |
| 8,977,147 | B2 | 3/2015 | Hirano |
| 9,164,440 | B2 | 10/2015 | Kimoto |
| 9,261,805 | B1* | 2/2016 | Aoki .................... G03G 9/0821 |
| 9,285,731 | B1* | 3/2016 | Katakura ........... G03G 15/2039 |
| 9,395,661 | B2* | 7/2016 | Naraoka ............ G03G 15/2039 |
| 2017/0136798 | A1 | 5/2017 | Doi |

FOREIGN PATENT DOCUMENTS

EP  3045976 A1  7/2016

OTHER PUBLICATIONS

Extended European Search Report dated Nov. 21, 2018, filed in counterpart European Patent Application No. 18184504.1, 9 pages.

* cited by examiner

*Primary Examiner* — Hoan Tran
(74) *Attorney, Agent, or Firm* — Kim & Stewart LLP

(57) ABSTRACT

An image forming apparatus includes a first printer section configured to form an image on a sheet using decolorable toner which is decolored by heating thereof, a second printer section configured to form an image on the sheet using non-decolorable toner, a heating section configured to heat the sheet on which the image is formed, and a controller configured to control the operation of the image forming apparatus based on an electric energy value which is an integrated value of power consumed within a predetermined time period.

20 Claims, 6 Drawing Sheets

| CONDITION | CONTROL CONTENT |
|---|---|
| ELECTRIC ENERGY (kWh) < TH1 | NO POWER REDUCTION CONTROL |
| TH1 ≤ ELECTRIC ENERGY (kWh) < TH2 | RESTRICTION OF PRINTING BY NON-DECOLORABLE TONER (FIRST OPERATION RESTRICTION) |
| TH2 ≤ ELECTRIC ENERGY (kWh) | RESTRICTION OF PRINTING BY NON-DECOLORABLE TONER AND DECOLORING PROCESSING (SECOND OPERATION RESTRICTION) |

FIG. 3

| CONDITION | CONTROL CONTENT |
|---|---|
| ELECTRIC ENERGY (kWh) < TH1 | NO POWER REDUCTION CONTROL |
| TH1 ≤ ELECTRIC ENERGY (kWh) < TH2 | RESTRICTION OF PRINTING BY NON-DECOLORABLE TONER (FIRST OPERATION RESTRICTION) |
| TH2 ≤ ELECTRIC ENERGY (kWh) < TH3 | RESTRICTION OF PRINTING BY NON-DECOLORABLE TONER AND DECOLORING PROCESSING (SECOND OPERATION RESTRICTION) |
| TH3 ≤ ELECTRIC ENERGY (kWh) | RESTRICTION OF PRINTING BY NON-DECOLORABLE TONER, DECOLORING PROCESSING AND POST-PROCESSING OPERATION |

FIG. 6

IMAGE FORMING APPARATUS AND CONSUMED POWER REDUCTION METHOD

CROSS-REFERENCE TO RELATED APPLICATION

This application is based upon and claims the benefit of priority from Japanese Patent Application No. 2017-156038, filed Aug. 10, 2017, the entire contents of which are incorporated herein by reference.

FIELD

Embodiments described herein relate generally to an image forming apparatus and a method of reducing power consumption, including the power consumed thereby.

BACKGROUND

Conventionally, there is a MFP (Multi-Function Peripheral) capable of executing image forming on a sheet using a non-decolorable toner and a decolorable toner. Printing using the non-decolorable toner consumes more power than does printing using the decolorable toner. Therefore, if the printing by the non-decolorable toner is executed often, it is difficult to reduce power consumption by the MFP, or in or at a location where the MFP is present.

DESCRIPTION OF THE DRAWINGS

FIG. 3 is a diagram illustrating a specific example of a control table;

FIG. 6 is a diagram illustrating a specific example of another constitution of the control table.

DETAILED DESCRIPTION

In accordance with an embodiment, an image forming apparatus includes a first printer section configured to form an image on a sheet using decolorable toner which is decolored by heating thereof, a second printer section configured to form an image on the sheet using non-decolorable toner, a heating section configured to heat the sheet on which the image is formed, and a controller configured to control the operation of the image forming apparatus based on an electric energy value which is an integrated value of power consumed within a predetermined time period. Hereinafter, an image forming apparatus and a consumed power reduction method of the embodiment are described with reference to the accompanying drawings.

Figure 1:
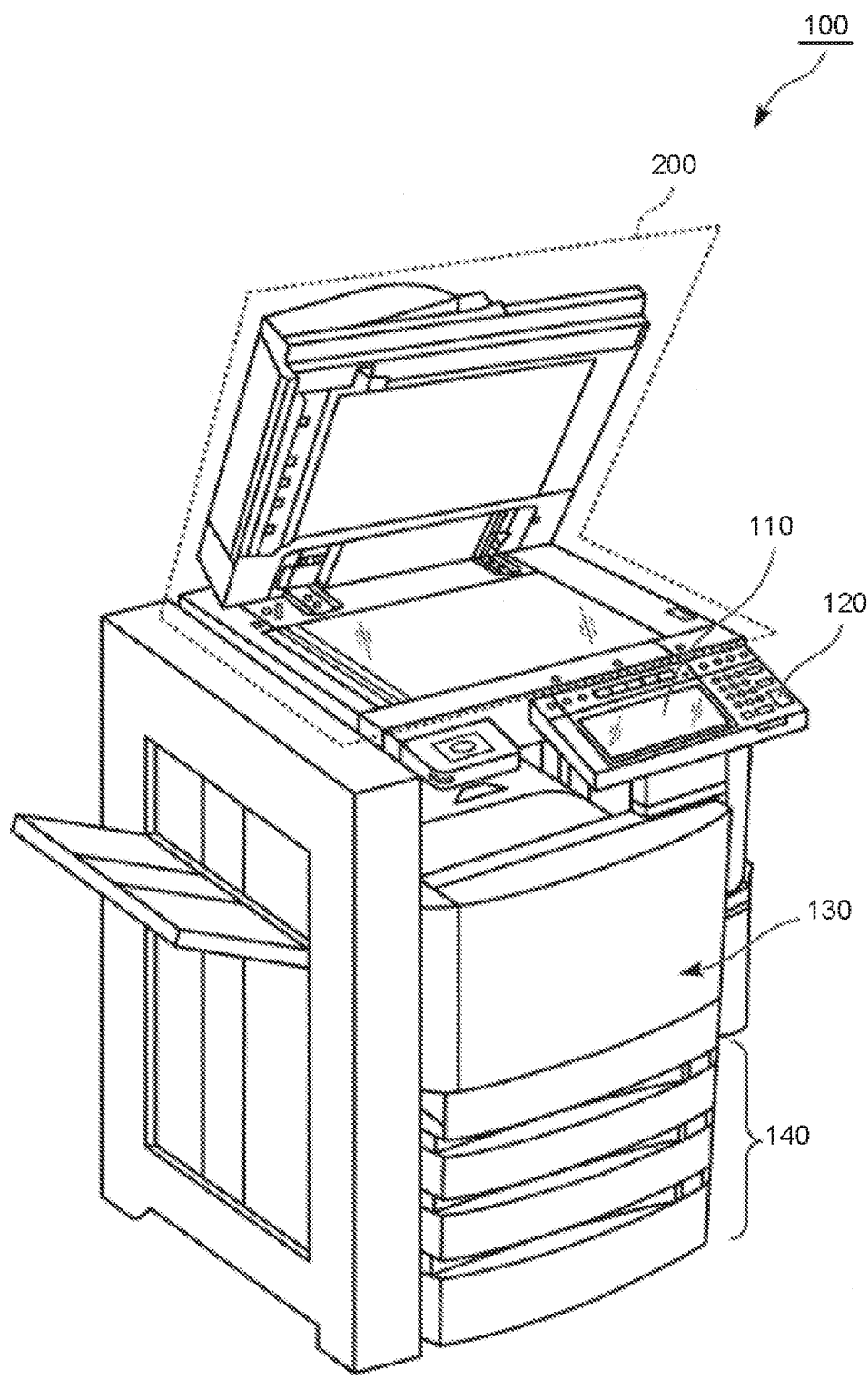
FIG. 1 is an external view exemplifying the overall constitution of an image forming apparatus according to an embodiment.

FIG. 1 is an external view exemplifying the overall constitution of an image forming apparatus 100 according to the embodiment. The image forming apparatus 100 of the embodiment is a multi-function peripheral capable of forming a toner image on a sheet. The sheet is, for example, a document or a paper on which characters or images are recorded, i.e., printed. The configuration of a sheet to be read or imaged by the image forming apparatus 100 is variable, as long as it can be read by the image forming apparatus 100. The image forming apparatus 100 reads an image shown on a sheet and generates digital data thereof to generate an image file thereof.

The image forming apparatus 100 is configured to execute image forming processing and decoloring processing. The image forming processing is a processing of forming an image on the sheet. The decoloring processing is a processing of decoloring a decolorable image formed on the sheet. Decoloring in the present embodiment means making an image formed with a color (including not only a chromatic color but also an achromatic color such as white and black) different from a base color of the sheet visually invisible on the sheet.

The image forming apparatus 100 includes a display 110, a control panel 120, a printer section 130, a sheet housing section 140 and an image reading section 200.

The display 110 is an image display device such as a liquid crystal display, an organic EL (Electro Luminescence) display and the like. The display 110 displays information relating to the image forming apparatus 100. The display 110 outputs a signal in response to an operation input by a user to a processor of the image forming apparatus 100. The display 110 receives an operation instruction input thereto by the user.

The control panel 120 includes a plurality of buttons. The control panel 120 receives an operation instruction input by the user. The control panel 120 outputs a signal in response to the operation instruction input thereto by the user to the processor of the image forming apparatus 100. Furthermore, the display 110 and the control panel 120 may be constituted together as an integrated touch panel.

The printer section 130 forms an image on a sheet using image information generated by the image reading section 200 or image information received through a communication path. The printer section 130 forms an image through the following processing, for example. An image forming section of the printer section 130 forms an electrostatic latent image on a photoconductive drum based on the image information. The image forming section of the printer section 130 forms a visible image by attaching the developer to the electrostatic latent image. Toner is exemplified as a concrete example of the developer. A transfer section of the printer section 130 transfers the visible image onto the sheet. A fixing section of the printer section 130 fixes the visible image on the sheet by heating and pressurizing the sheet. The fixing section includes a heating source such as a halogen lamp or an IH (Induction Heating) type heater.

In the present embodiment, the printer section 130 includes a toner which is a decolorable recording agent (hereinafter, referred to as a "decolorable toner") and a toner which is a non-decolorable recording agent (hereinafter, referred to as a "non-decolorable toner"). The non-decolorable toner is, for example, toner of the colors yellow (Y), magenta (M), cyan (C), and black (K). The non-decolorable toner is not decolorized by heating it to an elevated temperature. Similarly to the non-decolorable toner, the decolorable toner is a chromatic toner, for example, a blue toner. The decolorable toner becomes decolored at a temperature higher than the temperature at which the non-decolorable toner was fixed on the sheet. The sheet on which the image is formed may be a sheet housed in the sheet housing section 140 or may be a sheet manually fed into the image forming apparatus 100. The printer section 130 executes an image forming processing using the decolorable toner or the non-decolorable toner.

The sheet housing section 140 houses the sheet used in an image forming processing for non-decolorable toner or decolorable toner processing by the printer section 130.

The image reading section 200 reads the image on a sheet which is a reading object based on the differences in the intensity of the light reflected therefrom. For example, the image reading section 200 reads an image printed on the sheet which is a reading object set in the image reading section 200. The image reading section 200 records the read image data. The recorded image data may be transmitted to another information processing apparatus via a network. The recorded image data may be used to form an image on another sheet using the printer section 130.

Figure 2:
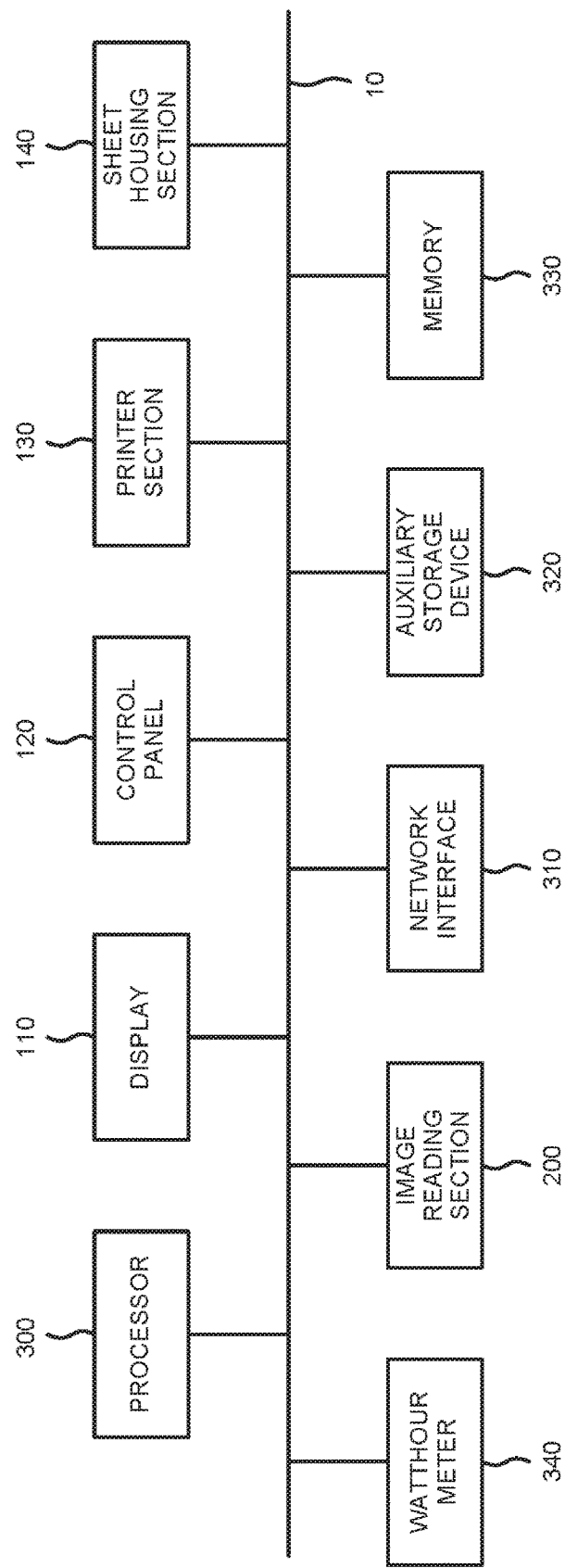
FIG. 2 is a block diagram illustrating the hardware arrangement of the image forming apparatus.

FIG. 2 is a block diagram illustrating the hardware configuration of the image forming apparatus 100. The image forming apparatus 100 includes the display 110, the control panel 120, the printer section 130, the sheet housing section 140, the image reading section 200, a processor 300, a network interface 310, an auxiliary storage device 320, a memory 330, and a watthour meter 340.

The display 110, the control panel 120, the printer section 130, the sheet housing section 140, and the image reading section 200 are previously described above, and thus the description thereof is not here repeated. The processor 300, the network interface 310, the auxiliary storage device 320, the memory 330, and the watthour meter 340 are described below. The functional sections are connected to each other so as to enable data communication via a system bus line 10.

The processor 300 is, for example, a CPU (Central Processing Unit). The processor 300 copies or decompresses a program stored in a ROM (Read Only Memory) in the memory 330 and executes various processing by executing the copied or decompressed program.

The network interface 310 is a communication interface. The network interface 310 transmits data to, and receives data from, another device. Here, another device is an information processing apparatus such as a personal computer, for example. The network interface 310 operates as an input interface to receive data or an instruction transmitted from another device. The instruction transmitted from another device is an execution instruction of printing, or the like. The network interface 310 operates as an output interface to transmit data to another device.

The auxiliary storage device 320 is, for example, a hard disk or a SSD (Solid State Drive), which stores various data. Various data include, for example, a control table, digital data, jobs, and job logs. The control table is a table in which information for control of the image forming apparatus 100 is registered, i.e. recorded and maintained.

The memory 330 is, for example, a RAM (Random Access Memory). The memory 330 temporarily stores data used by each functional section of the image forming apparatus 100. The memory 330 may store the digital data generated by the image reading section 200. The memory 330 may temporarily store jobs and job logs.

The watthour meter 340 measures electric energy used in the image forming apparatus 100 in a discrete period of time by integrating the power consumed in the image forming apparatus 100 over that time period. For example, if the watthour meter 340 has a communication function, information indicating the measured electric energy value is transmitted to the processor 300 at predetermined time intervals. The predetermined time interval is, for example, units of one hour. Hereinafter, the information indicating the electric energy used is described as electric energy value information.

FIG. 3 is a diagram illustrating a specific example of the control table. The control table has a plurality of records 20. The records 20 have values of conditions and control content related to the conditions. The value of a condition indicates a condition for enabling the processor 300 to execute a power reduction control. The power reduction control is used for reducing the power consumed in the image forming apparatus 100. The value of the control content indicates control content executed if the condition related to the specific record 20 is satisfied.

In the example shown in FIG. 3, a plurality of conditions is registered in the control table. These conditions are "electric energy (kWh)<TH1", "TH1≤electric energy (kWh) <TH2", "TH2≤electric energy (kWh)". In FIG. 3, in the record 20 registered in the uppermost row of the control table, the value of condition is "electric energy (kWh)<TH1" and the value of the control content is "no power reduction control". It indicates that if the acquired electric energy is less than a threshold value TH1, the processor 300 does not execute power reduction control. Furthermore, TH1≤TH2.

In the record 20 registered in the second row of the control table, the value of the condition is "TH1 the electric energy (kWh)<TH2", the value of the control content is "restriction of printing by the non-decolorable toner". It indicates that if the acquired electric energy is equal to or greater than the threshold value TH1 and less than a threshold value TH2, the processor 300 restricts, i.e., prevents, printing using the non-decolorable toner. Here, restricting the printing by the non-decolorable toner means that printing using the non-decolorable toner is not executed. In the following description, "restriction of printing by the non-decolorable toner" is described as a first operation restriction.

In the record 20 registered in the third row of the control table, the value of the condition is "TH2 electric energy (kWh)", the value of the control content is "restriction of printing by the non-decolorable toner and decoloring processing". It indicates that if the acquired electric energy is equal to or greater than the threshold value TH2, the processor 300 restricts the printing using the non-decolorable toner and also decoloring processing. In the following description, "restriction of printing by the non-decolorable toner and the decoloring processing" is described as a second operation restriction.

Figure 4:
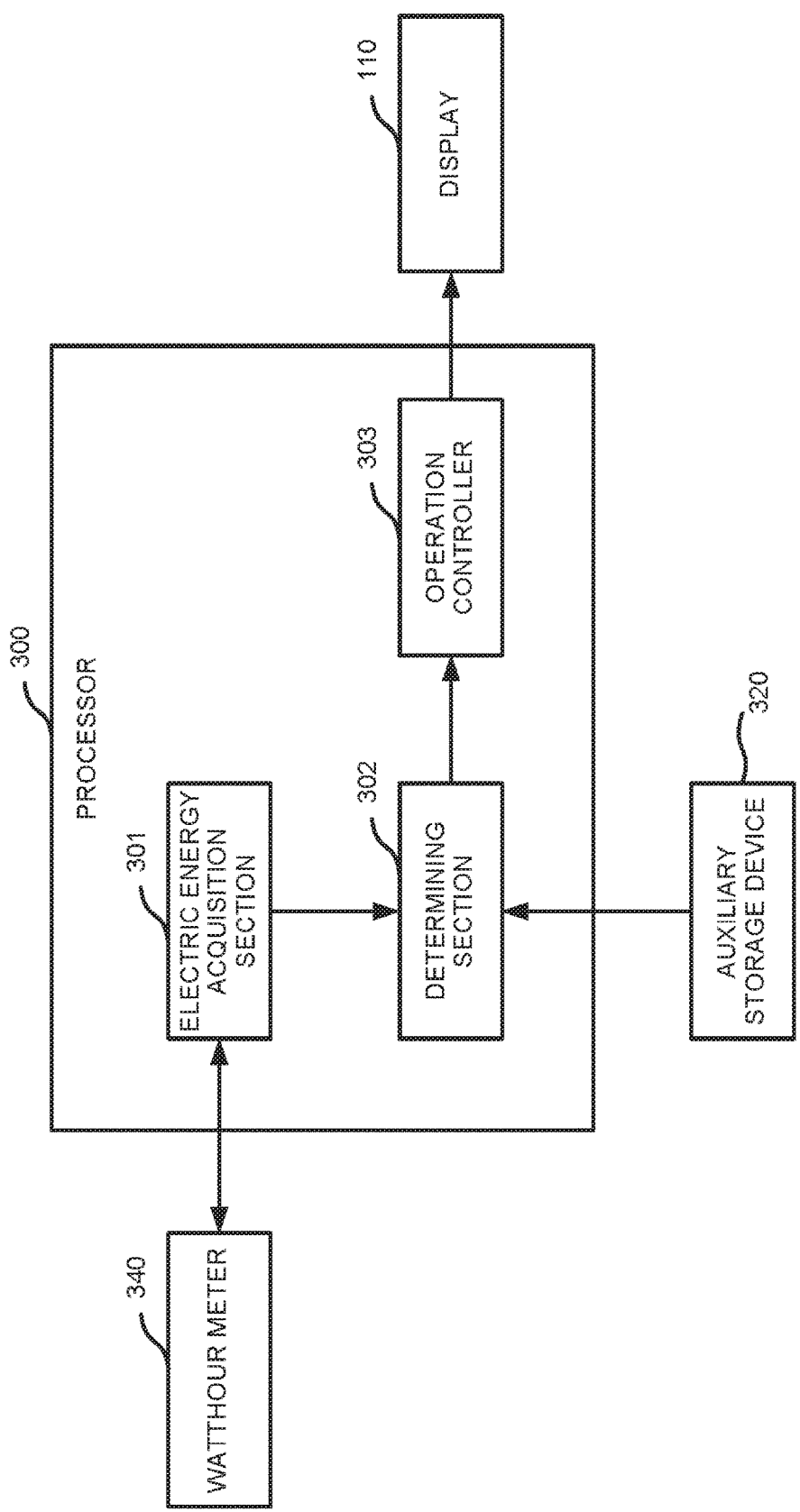
FIG. 4 is a schematic block diagram illustrating the functional component of a processor.

FIG. 4 is a schematic block diagram illustrating the functional component of the processor 300. The processor 300 includes an electric energy acquisition section 301, a determining section 302 and an operation controller 303.

The electric energy acquisition section 301 acquires the electric energy information. For example, the electric energy acquisition section 301 acquires the electric energy information measured by the watthour meter 340 at predetermined time intervals. The electric energy acquisition section 301 may acquire the electric energy information by accessing the watthour meter 340. The electric energy acquisition section 301 may acquire the electric energy information by receiving the electric energy information transmitted from the watthour meter 340.

Based on the electric energy information acquired by the electric energy acquisition section 301 and the control table, the determining section 302 determines whether or not a power control (hereinafter, referred to as the power reduction control) for reducing the consumed power should be executed.

The operation controller 303 controls the operation of the image forming apparatus 100. For example, the operation controller 303 performs the power reduction control if the determining section 302 determines that the power reduction control should be executed. For example, the operation controller 303 controls the display 110 to perform control such that a processing which consumes a large amount of power cannot be selected. The processing consuming a large amount of power is, for example, the printing by the non-decolorable toner, or the decoloring processing. The operation controller 303 executes an operation in response to the instruction. The operation in response to the instruction is the image forming processing and the decoloring processing.

The power consumed in the image forming processing and the decoloring processing executed by the image forming apparatus 100 satisfies the following relationship.

The printing processing using the non-decolorable toner>the printing processing of decoloring the decolorable toner>the printing processing using the decolorable toner.

As mentioned above, the consumed power in the image forming processing and the decolorable processing is less in the order of the printing processing using the non-decolorable toner, the decoloring processing, and the printing processing using the decolorable toner. In the image forming processing and the decoloring processing, the consumed power is mostly a function of the power consumption in the fixing section.

Figure 5:
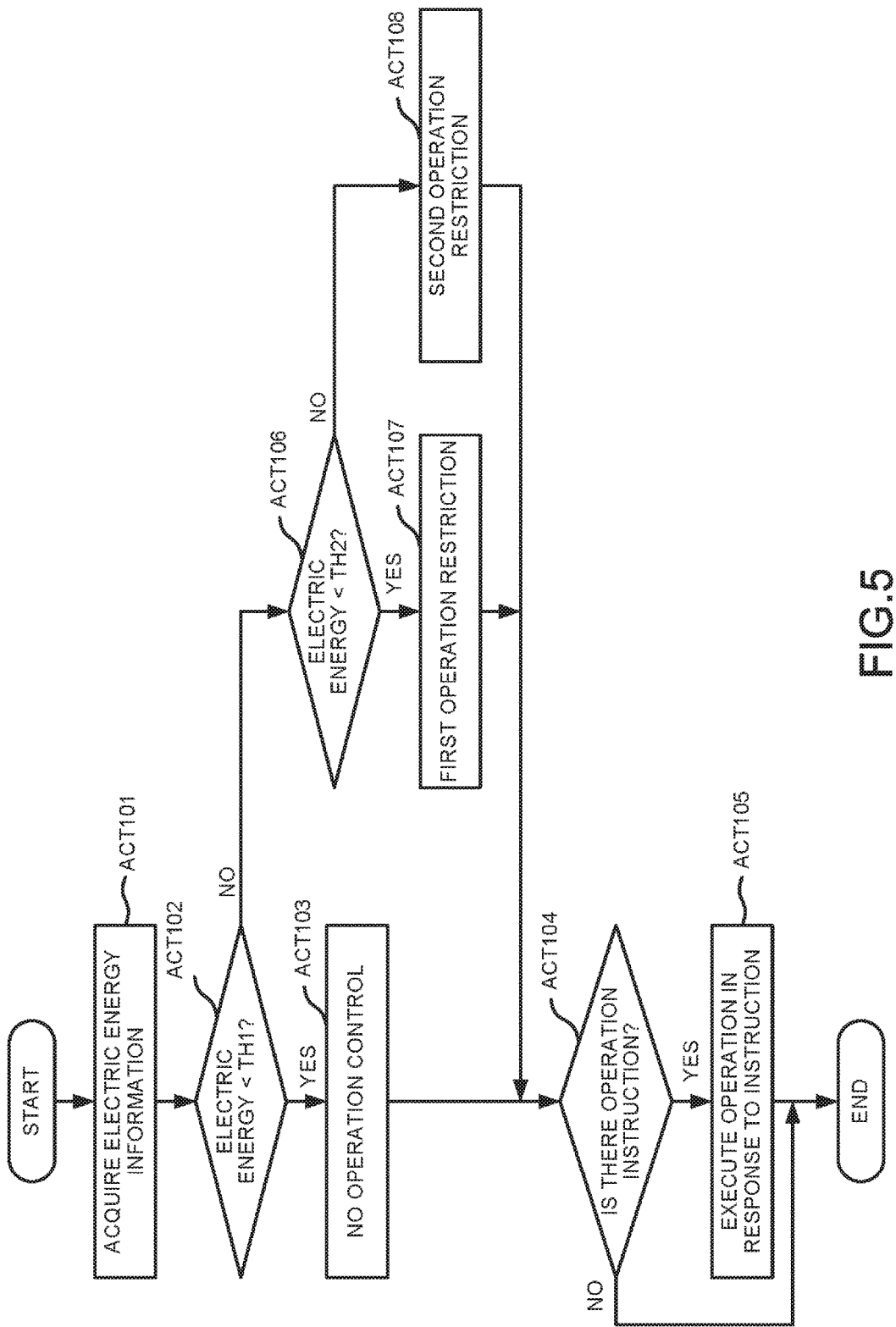
FIG. 5 is a flowchart illustrating a flow of a processing of the image forming apparatus according to the embodiment.

FIG. 5 is a flowchart illustrating the flow of the processing of the image forming apparatus 100 according to the embodiment.

The electric energy acquisition section 301 acquires the electric energy information measured by the watthour meter 340 (ACT 101). The electric energy acquisition section 301 outputs the acquired electric energy information to the determining section 302. The determining section 302 inputs the output electric energy information thereinto. The determining section 302 determines whether or not the electric energy value of the electric energy information is less than a threshold value TH1 (ACT 102).

If the electric energy is less than the threshold value TH1 (Yes in ACT 102), the determining section 302 outputs a notification to the operation controller 303 indicating that the electric energy is less than the threshold value TH1. Here, the notification indicating that the electric energy is less than the threshold value TH1 includes information that the electric energy (kWh)<TH1. The operation controller 303 inputs thereinto the notification output from the determining section 302. The operation controller 303 refers to the control table and performs control according to the received notification. Specifically, first, the operation controller 303 selects the record 20 corresponding to the content of the notification among the records 20 registered in the control table. Then, the operation controller 303 executes the control content registered in the item of the control content of the selected record 20. Here, since the notification includes the information that the electric energy (kWh)<TH1, the operation controller 303 does not execute the power reduction control (ACT 103).

Thereafter, the operation controller 303 determines whether or not there is the operation instruction (ACT 104). For example, if the instruction is input via the display 110 or the network interface 310, the operation controller 303 determines that there is an operation instruction. On the other hand, if no instruction is input via the display 110 or the network interface 310, the operation controller 303 determines that there is no operation instruction. If there is no operation instruction (No in ACT 104), the image forming apparatus 100 terminates the processing.

On the other hand, if there is the operation instruction (Yes in ACT 104), the operation controller 303 executes an operation in response to the instruction (ACT 105).

For example, if printing processing is instructed, the operation controller 303 enables the printer section 130 to execute the image forming processing. At this time, the operation controller 303 executes image forming processing using the selected toner (the non-decolorable toner or the decolorable toner). For example, if decolorable toner processing is instructed, the operation controller 303 enables the printer section 130 to execute the decolorable toner processing.

In the processing in ACT 102, if the electric energy value is not less than the threshold value TH1 (No in ACT 102), the determining section 302 determines whether or not the electric energy is less than the threshold value TH2 (ACT 106).

If the electric energy is less than the threshold value TH2 (Yes in ACT 106) and not less than the threshold value TH1, the determining section 302 outputs a notification to the operation controller 303 indicating that the electric energy value is equal to or greater than the threshold value TH1 and less than the threshold value TH2. Here, the notification indicating that the electric energy value is equal to or greater than the threshold value TH1 and less than the threshold value TH2 is information that TH1≤electric energy (kWh)<TH2.

The operation controller 303 inputs thereinto the notification output from the determining section 302. The operation controller 303 then refers to the control table and performs control according to the inputted notification. Specifically, first, the operation controller 303 selects the record 20 corresponding to the content of the notification from among the records 20 registered in the control table. Then, the operation controller 303 executes according to the control content registered in the item of the control content of the selected record 20. Herein, since the notification contains information that TH1≤electric energy (kWh)<TH2, the operation controller 303 performs the first restriction (ACT 107) operation.

Specifically, the operation controller 303 performs control so that printing using the non-decolorable toner cannot be executed. As a method for preventing the execution of printing using the non-decolorable toner, any one of the following methods can be exemplified.

(1) Control so as not to display a button on the display 110 for executing printing using the non-decolorable toner.

(2) Control so that the button for executing printing using the non-decolorable toner cannot be selected.

(3) Control so as not to receive input of pressing of the button for executing printing using the non-decolorable toner even if the button for executing the printing by the non-decolorable toner is pressed.

The operation controller 303 prevents the execution of the printing using the non-decolorable toner according to any one of methods (1) to (3) described above. The method to be used may be preset, may be set by the user, or may be selected to occur during a preset time period.

I. In a case of control so as not to display the button for executing printing using the non-decolorable toner on the display 110.

The operation controller 303 outputs screen information for preventing user selection of an execution instruction of printing using the non-decolorable toner to the display 110. Here, the screen information for preventing user selection of an execution instruction of printing using the non-decolorable toner is screen information in which the display icon for executing printing using the non-decolorable toner is not present.

II. In a case of control so that the button for executing the printing by the non-decolorable toner cannot be selected.

The operation controller 303 controls the display 110 to gray the button, i.e., change it from its normal color to the color gray, for executing printing using the non-decolorable toner displayed on the display 110. If the button for executing printing using the non-decolorable toner cannot be selected, the operation controller 303 may perform control so as not to select it by any other method.

III. In a case of control so as not to receive input of press even if the button for executing the printing by the non-decolorable toner is pressed.

The operation controller 303 deletes the notification if a notification indicating that the button for executing printing using the non-decolorable toner is pressed as a user input. The notification may be output by the display 110 or may be output by the control panel 120.

In the processing in ACT 106, if the electric energy value is not less than the threshold value TH2 (No in ACT 106), the following processing is executed. Specifically, the determining section 302 outputs a notification indicating that the electric energy value is not less than the threshold value TH2 to the operation controller 303. Here, the notification indicating that the electric energy value is not less than the threshold value TH2 includes information that TH2 electric energy (kWh). The operation controller 303 inputs the notification output from the determining section 302. The operation controller 303 refers to the control table and performs control according to the input notification. Specifically, first, the operation controller 303 selects the record 20 corresponding to the content of the notification from among the records 20 registered in the control table. Then, the operation controller 303 executes the control content registered in the item of the control content of the selected record 20. Since the notification contains the information that TH2≤electric energy (kWh), the operation controller 303 executes the second operation restriction (ACT 108).

Specifically, the operation controller 303 performs control so that the printing by the non-decolorable toner and the decoloring processing cannot be executed. The method of preventing the execution of the printing by the non-decolorable toner is as described above. As a method for preventing the execution of the decoloring processing, anyone of the following methods can be mentioned.

(1) Control so as not to display a button for executing the decoloring processing on the display 110.

(2) Control so that the button for executing the decoloring processing cannot be selected.

(3) Control so as not to receive input of press even if the button for executing the decoloring processing is pressed.

The operation controller 303 prevents the execution of the decoloring processing according to any one of the methods (1) to (3) described above. The method to be used may be preset, may be set by the user, or may be selected according to the time zone.

I. Control so as not to display the button for executing the decoloring processing on the display 110.

The operation controller 303 outputs screen information for preventing the selection of an execution instruction for decoloring processing to the display 110. The screen information for preventing the selection of the execution instruction of the decoloring processing is, for example, screen information in which the button for executing the decoloring processing is not contained.

II. In a case of control so that the button for executing the decolorable processing cannot be selected.

The operation controller 303 controls the display 110 to gray the button for executing the decolorable processing displayed on the display 110 so that it cannot be selective, i.e., it is inactive. If the button for executing the decoloring processing cannot be selected, the operation controller 303 may perform control so that it cannot be selected by any other method.

III. In a case of control so as not to receive input of press even if the button for executing the decolorable processing is pressed.

The operation controller 303 deletes the notification if a notification indicating that the button for executing the decoloring processing is pressed as a user input. The notification may be output by the display 110 or may be output by the control panel 120.

According to the image forming apparatus 100 constituted as described above, it is possible to reduce the consumed power. The image forming apparatus 100 performs control so that the printing by the non-decolorable toner cannot be executed if the electric energy is equal to or greater than the threshold value TH1. For the printing by the non-decolorable toner, it is necessary to raise the lamp temperature compared to the printing by the decolorable toner and the decoloring processing. In other words, longer time is taken to energize the lamp in the printing by the non-decolorable toner compared with the printing by the decolorable toner and the decoloring processing. Therefore, the image forming apparatus 100 performs control so that printing using the non-decolorable toner cannot be executed by operation control. As a result, the processing which consumes a large amount of power is not executed. Therefore, it is possible to reduce the power consumed by the image forming apparatus 100.

The image forming apparatus 100 performs control so that the printing by the non-decolorable toner and the decoloring processing cannot be executed if the electric energy is equal value to or greater than the threshold value TH2. The decoloring processing requires higher lamp temperature than printing using the decolorable toner. In other words, longer time is taken to energize the lamp in the decoloring processing compared to printing using the decolorable toner. Therefore, the image forming apparatus 100 performs control so that printing by the non-decolorable toner and the decoloring processing cannot be executed by the operation control. As a result, the processing which consumes a large amount of power is not executed. Therefore, it is possible to further reduce the power consumed by the image forming apparatus 100.

Modifications of the image forming apparatus 100 are described below.

In the present embodiment, the electric energy acquisition section 301 acquires the electric energy information from the watthour meter 340. The electric energy measured by the watthour meter 340 is the integrated value of the power consumed by the image forming apparatus 100. The electric energy acquisition section 301 may acquire the electric energy information for the entire floor or the entire building where the image forming apparatus 100 is installed. In this way, the electric energy acquisition section 301 communicates with a server collecting the electric energy information in the entire floor or the entire building via the network interface 310. Thus, the electric energy acquisition section 301 acquires the electric energy information for the entire floor or the entire building. The server may be provided by on the cloud or may be provided in a building in which the image forming apparatus 100 is installed.

As a result, the image forming apparatus 100 can control the operation based on not only the power consumed by the image forming apparatus 100 but also based on the power consumed in the building where the image forming apparatus 100 is installed.

The watthour meter 340 may not be provided in the image forming apparatus 100. In such constitution, the watthour meter 340 is provided on a supply line that supplies the power to the image forming apparatus 100. The watthour meter 340 then measures the electric energy from the power supplied to the image forming apparatus 100.

In the present embodiment, the operation controller 303 controls the display 110 to perform control so that the execution instruction of the printing by the non-decolorable toner and the execution instruction of the decoloring processing cannot be executed. If the image forming apparatus 100 is connected to another device, the operation controller 303 may control the operation in another device. In this case, the operation controller 303 performs control so that the execution instruction of the printing by the non-decolorable toner and the execution instruction of the decoloring processing cannot be executed in another apparatus. In other words, the control is performed so that only the execution instruction of the printing by the decolorable toner can be executed. For example, the operation controller 303 provides the screen information for preventing the selection of the execution instruction of the printing by the non-decolorable toner and the execution instruction of the decoloring processing if the request for printing is made from another device. In this case, the screen information for preventing selection is, for example, the screen information in which the button for executing the printing by the non-decolorable toner and the button for executing the decoloring processing are not present.

In the present embodiment, the operation controller 303 restricts the image forming processing and the decoloring processing as the power reduction control, but the present invention is not limited thereto. For example, the operation controller 303 may restrict other operations depending on the electric energy value. The other operations include, for example, a post-processing operation after the image forming processing, such as use of a finisher, a sorting function, a stapling function, and the like. In such a constitution, for example, the control table may be constituted as shown in FIG. 6. FIG. 6 is a diagram illustrating a specific example of another constitution of the control table. The difference between the control table shown in FIG. 6 and that shown in FIG. 3 is that the control content for restricting the post-processing operation is increased by one. Here, the operation controller 303 restricts three operations if the electric energy indicated by the electric energy value information is equal to or greater than a threshold value TH3. For example, the operation controller 303 restricts the printing by the non-decolorable toner, the decoloring processing, and the post-processing operation where TH1≤TH2≤TH3.

Thus, the image forming apparatus 100 can further reduce the consumed power.

The operation controller 303 may control the operation of another image forming apparatus 100 according to a notification output from the determining section 302. For example, the operation controller 303 sends the notification output from the determining section 302 to another image forming apparatus 100 via the network interface 310. The operation controller 303 of another image forming apparatus 100 performs operation restriction according to the received notification. In such constitution, at least one of the image forming apparatuses 100 has the electric energy acquisition section 301. The operation controller 303 of the image forming apparatus 100 having the electric energy acquisition section 301 transmits the notification to another image forming apparatus 100 via the network interface 310. The operation controller 303 may randomly determine another image forming apparatus 100 to which the notification is transmitted. Each image forming apparatus 100 may be connected in a wired or wireless manner.

As a result, the image forming apparatus 100 can perform other operation restrictions of the image forming apparatus 100 according to the acquired electric energy information.

According to the image forming apparatus 100 of at least one embodiment described above, the consumed power can be reduced.

A part of the functions of the image forming apparatus 100 according to the foregoing embodiment may be realized by a computer. In this case, programs for realizing the functions are recorded in a computer-readable recording medium. The functions may be realized by reading the programs recorded in the recording medium into a computer system and executing the programs. Further, it is assumed that the "computer system" described herein contains an OS or hardware such as peripheral devices. Further, the "computer-readable recording medium" refers to a portable medium or a storage device. The portable medium is a flexible disc, a magneto-optical disk, a ROM, a CD-ROM and the like. The storage device is a hard disk built in the computer system. Furthermore, the "computer-readable recording medium" refers to a medium for dynamically holding the programs for a short time like a communication wire in a case in which the programs are sent via a communication line. The communication line is a network such as the Internet or a telephone line. The "computer-readable recording medium" may be a volatile memory in the computer system serving as a server and a client. The volatile memory holds the programs for a certain period of time. The foregoing programs may realize a part of the above-mentioned functions. The foregoing programs may realize the functions described above by the combination with the programs already recorded in the computer.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:
1. An image forming apparatus comprising:
a first printer section configured to form an image on a sheet using decolorable toner which is decolored by heating thereof;
a second printer section configured to form an image on the sheet using non-decolorable toner;
a heating section configured to heat the sheet on which the image is formed; and
a controller configured to control the operation of the image forming apparatus based on an electric energy value which is an integrated value of power consumed within a predetermined time period.

2. The image forming apparatus according to claim 1, wherein an energy meter configured to output the electric energy value is coupled to the image forming apparatus.

3. The image forming apparatus according to claim 2, wherein the controller is configured to:
receive a signal indicative of the electric energy value from the energy meter; and
if the electric energy value is greater than a first preset value, control the image forming apparatus such that image forming processing using the non-decolorable toner cannot be performed.

4. The image forming apparatus according to claim 3, wherein the controller is configured to:
if the electric energy value is greater than a second preset value, which is greater than the first preset value, control the image forming apparatus such that decoloring processing also cannot be performed.

5. The image forming apparatus according to claim 4, wherein the decoloring processing includes heating the sheet on which the image is formed of decolorable toner with the heating section to thereby decolor the sheet.

6. The image forming apparatus according to claim 4, further comprising:
a post-processing section configured to perform at least one post-processing on a printed sheet; and
the controller is configured to:
if the electric energy value is greater than a third preset value greater than the second preset value, control the image forming apparatus such that the post-processing also cannot be performed.

7. The image forming apparatus of claim 2, wherein the energy meter is located on the image forming apparatus.

8. The image forming apparatus according to claim 7, further comprising:
a display section configured to display information concerning the image forming apparatus, including user selectable display icons; and
wherein, when the electric energy value is greater than a first preset value and less than a second preset value, the controller performs at least one of:
preventing the display on the display section of an icon for selecting printing using non-decolorable toner;
displaying an icon for selecting printing using non-decolorable toner in a non-user selectable manner; and
preventing the display on the display section of an icon for selecting printing using non-decolorable toner.

9. An image forming apparatus configured to restrict the power that can be used thereby based on an energy value supplied thereto by an energy measuring device, comprising:
a first printer section configured to form an image on a sheet at a first image forming temperature using a decolorable toner which is decolorable by heating thereof;
a second printer section configured to form an image on a sheet at a second image forming temperature greater than the first image forming temperature using a non-decolorable toner;
a heating section configured to heat the sheet on which the image is being formed to one of the first and second image forming temperatures, wherein the energy required to supply the second image forming temperature is greater than that required to apply the first image forming temperature; and
a controller configured to control the operation of the image forming apparatus based on the energy value supplied by the energy measuring device.

10. The image forming apparatus according to claim 9, wherein the heating section is further configured to heat a sheet on which an image has been formed to a third temperature, greater than the first image forming temperature and less than the second image forming temperature.

11. The image forming apparatus according to claim 10, wherein the controller is configured to perform a function to prevent printing using the non-decolorable toner when the energy value exceeds a first threshold value.

12. The image forming apparatus according to claim 10, wherein the controller is configured to perform a function to prevent printing using the non-decolorable toner and prevent decoloring of a sheet having decolorable toner thereon when the energy value exceeds a first threshold value and a second threshold value greater than the first threshold value.

13. The image forming apparatus according to claim 10, further comprising:
a post-processing section configured to perform post-processing of a sheet on which an image has been formed, wherein
the controller is configured to perform a function to prevent printing using the non-decolorable toner, prevent decoloring of a sheet having decolorable toner thereon, and prevent post processing of a sheet when the energy value exceeds a first threshold value, a second threshold value greater than the first threshold value, and a third threshold value greater than the second threshold value.

14. The image forming apparatus according to claim 9, wherein the energy value is a value of energy used by the image forming apparatus over a discrete period of time.

15. The image forming apparatus according to claim 9, wherein the energy value is a value of energy used in the location where the image forming apparatus is located, over a discrete period of time.

16. A method of reducing power consumption by an image forming apparatus which forms an image on a sheet with a decolorable toner which is decolored by heating thereof, or with a non-decolorable toner, comprising
acquiring an electric energy value which is an integrated value of consumed power within a predetermined time period; and
limiting the available functions of the image forming apparatus based on the acquired electric energy value.

17. The method according to claim 16, wherein the image forming apparatus comprises:
a first printer section configured to form an image on a sheet at a first image forming temperature using a decolorable toner which is decolorable by heating thereof;
a second printer section configured to form an image on a sheet at a second image forming temperature greater than the first image forming temperature using a non-decolorable toner; and
a heating section configured to:
during image forming, heat the sheet on which the image is being formed to the first and second image forming temperatures, wherein the energy required to supply the second image forming temperature is greater than that required to form the first image forming temperature, and
during image decoloring, heat a sheet on which an image has been formed to a third temperature, greater than the first image forming temperature and less than the second image forming temperature.

18. The method according to claim 17, wherein, if the energy value exceeds a first preset value but is less than a second preset value greater than the first preset value, the function of forming an image on a sheet using non-decolorable toner is disabled.

19. The method according to claim 17, wherein, if the energy value exceeds a first preset value, and also exceeds a second preset value greater than the first preset value, the function of forming an image on a sheet using non-decolorable toner, and the function of decoloring a decolorable image, are disabled.

20. The method according to claim 16, wherein the energy value is a value for energy used in a location in which the image forming apparatus is located.

* * * * *